(No Model.)
P. M. PAPIN.
FISHING LINE FLOAT.
No. 458,129. Patented Aug. 18, 1891.
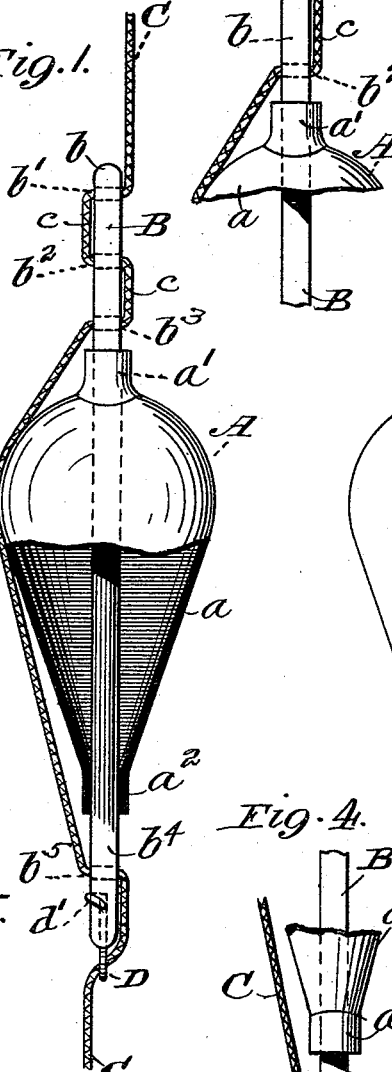
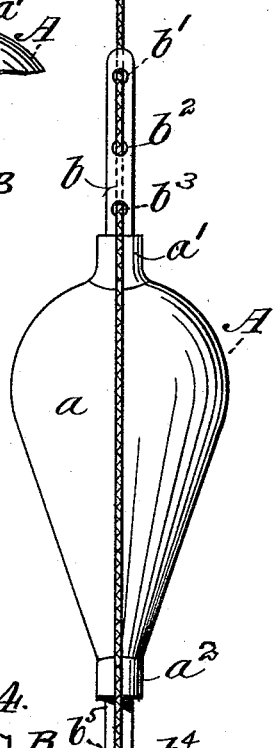
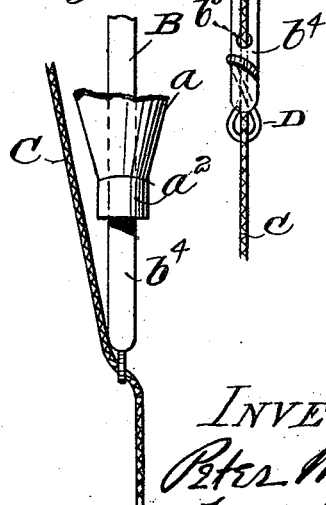
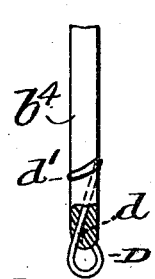
WITNESSES
Edward W. Turrell
A. Bonville
INVENTOR
Peter M. Papin
by C. D. Moody
his atty

UNITED STATES PATENT OFFICE.

PETER M. PAPIN, OF ST. LOUIS, MISSOURI, ASSIGNOR OF ONE-HALF TO THOMAS M. KNAPP, OF SAME PLACE.

FISHING-LINE FLOAT.

SPECIFICATION forming part of Letters Patent No. 458,129, dated August 18, 1891.

Application filed December 8, 1890. Serial No. 373,989. (No model.)

*To all whom it may concern:*

Be it known that I, PETER M. PAPIN, of St. Louis, Missouri, have made a new and useful Improvement in Fishing-Line Floats, of which the following is a full, clear, and exact description.

The improvement relates partly to the construction of the float and partly to the means for connecting it with the line, substantially as is hereinafter set forth and claimed, aided by the annexed drawings, making part of this specification, in which—

Figure 1 is a vertical section showing the improved float attached to the line. The view is in elevation, saving that a portion of the float is broken away. Fig. 2 is an elevation of the same parts, the view being at right angles to that of Fig. 1; Fig. 3, an elevation from the point of view of Fig. 1, but showing the upper portion only of the float and stem and exhibiting a modified construction; Fig. 4, an elevation of the lower end of the float and stem and exhibiting a modified connection with the line; and Fig. 5, an elevation, partly in section, of the lower end of the float-stem with the improved eyelet attached.

The same letters of reference denote the same parts.

A represents the improved float, B the stem to which the float is attached, and C the fishing-line. Saving as the construction is modified or supplemented by the improvement under consideration, it is of the usual character.

So far as its connection with the fishing-line is concerned, the float may be of any suitable material and form. It is preferably, however, hollow and elastic, to which end it may be made of rubber, and the most desirable method of connecting it with the fishing-line is to attach it to a stem, which in turn is connected with the fishing-line.

The preferable form of the float, so far as its general shape is concerned, is exhibited in the drawings. An important feature of the improved float is the special construction of that portion of the float which comes immediately in contact with the stem. In place of simply perforating the shell $a$ of the float to receive the stem, the shell is extended, substantially as shown at $a'$ and $a^2$, at the upper and lower ends of the float where the stem passes through the float, to form extended bearings at the points of contact with the stem. By this means a very perfect joint around the stem is formed and the air is retained within the float and the water is prevented from leaking past the stem into the float. These extended bearings are also serviceable, in that thereby the float can be readily held at any point of adjustment upon the stem, for by suitably constructing the float so as to bind at $a'$ $a^2$ upon the stem the float can be held against accidental displacement and at the same time be capable of being slipped upon the stem when desired. A float thus constructed is valuable partly on account of its buoyancy and partly by reason of its noiseless and resilient qualities. Various methods have heretofore been adopted for so connecting the float with the line to render it adjustable thereon. A leading feature of the present improvement is the means whereby a very durably and at the same time a very convenient and easily-adjusted connection is obtained. In one of the ends of the stem B, and, perhaps, in both of its ends, and preferably in its upper end $b$, are two or more perforations $b'$ $b^2$ $b^3$, &c. The line C is carried forward and backward through these perforations and then past the float, and is then connected with the lower end $b^4$ of the stem. By this means to adjust the float it is only necessary to loosen the bight $c$ of the line and then slip the line and float upon each other to the desired point and then tighten the line in and upon the stem, and in some cases the friction of the line in the stem perforations is sufficient to enable the float to remain at any point of adjustment on the line, but at the same time not so great but that the operator can readily adjust the float by simply drawing the line through the stem perforations without having to first loosen the line, as described. The connection is also desirable, in that no additional part is required to connect the line at that point with the stem. Two at least of the perforations $b'$ $b^2$ must be used, and more, if desired. In Figs. 1 and 2 three perforations are shown in the upper end of the stem. In Fig. 3 only two are exhibited. As above suggested, the same system of perforations may be employed to connect the line with the other end of the float-stem; but this is not in all cases necessary. With a connection, such as described, at the upper end of the float-stem, almost any connection of the line with the lower end of the float-stem will in a measure answer. Desirable connections are shown in Figs. 1 and 4, respectively. In the construction of Fig. 4 the line C is simply carried through an eyelet D in the lower end of the stem. In Fig. 1 the line is shown carried through a perforation $b^5$ in the stem and also through an eyelet.

An additional feature of the improvement is the eyelet D shown. Hitherto the eyelet in the lower end of a float has usually been constructed and attached by making the eyelet with a straight shank and extending it or screwing it directly upward into the stem. Such an eyelet is liable to work loose, and I overcome the difficulty as follows: The eyelet-shank $d$ is extended obliquely upward into and through the stem end, and the projecting portion $d'$ of the shank is clinched upon the stem, substantially as shown in Figs. 1, 2, and 5.

I claim—

The fishing-line float having its stem provided with a series of passages arranged to permit alternately looping the line therethrough at opposite sides, the hollow elastic float having the extended tubular end portions, and the eyelet having its shank extended upward and obliquely through the stem and clinched thereupon and its eye extended beyond the lower end of said stem and having the line passing therethrough, substantially as set forth.

Witness my hand this 5th day of December, 1890.

PETER M. PAPIN.

Witnesses:
THOMAS M. KNAPP,
C. D. MOODY,
PULASKI LANGALIER.